(12) United States Patent
Coelho Ferreira

(10) Patent No.: US 9,518,487 B2
(45) Date of Patent: Dec. 13, 2016

(54) FILTER

(71) Applicant: Carlos Eduardo Coelho Ferreira, Sao Paulo (BR)

(72) Inventor: Carlos Eduardo Coelho Ferreira, Sao Paulo (BR)

(*) Notice: Subject to any disclaimer, the term of this patent is extended or adjusted under 35 U.S.C. 154(b) by 116 days.

(21) Appl. No.: 14/562,841

(22) Filed: Dec. 8, 2014

(65) Prior Publication Data
US 2016/0097311 A1 Apr. 7, 2016

(51) Int. Cl.
| | | |
|---|---|---|
| *B01D 46/42* | (2006.01) | |
| *B01D 53/04* | (2006.01) | |
| *B01D 46/10* | (2006.01) | |
| *B60H 3/06* | (2006.01) | |
| *F01N 3/035* | (2006.01) | |
| *B03C 3/017* | (2006.01) | |
| *B03C 3/41* | (2006.01) | |
| *B01D 46/00* | (2006.01) | |
| *B01D 46/50* | (2006.01) | |

(52) U.S. Cl.
CPC ............ *F01N 3/035* (2013.01); *B01D 46/009* (2013.01); *B01D 46/0028* (2013.01); *B01D 46/50* (2013.01); *B03C 3/017* (2013.01); *B03C 3/41* (2013.01); *B01D 2279/40* (2013.01); *B03C 2201/30* (2013.01)

(58) Field of Classification Search
CPC ......... B01D 46/42; B01D 53/04; B01D 46/10; B01D 46/0036; B01D 53/261; B01D 2253/108; B01D 2257/93; B60H 3/06; B60H 3/0658; B60H 2003/0691
USPC .............................. 55/385.1, 385.3; 123/198 E
See application file for complete search history.

(56) References Cited

U.S. PATENT DOCUMENTS

| | | | |
|---|---|---|---|
| 6,280,691 B1* | 8/2001 | Homeyer | B01D 53/885 422/122 |
| 7,156,897 B2* | 1/2007 | Wen | A23L 3/28 422/121 |
| 7,749,303 B2* | 7/2010 | Wright | B01D 53/0454 55/DIG. 34 |
| 7,811,365 B2* | 10/2010 | Grzonka | B01D 35/06 174/17 CT |
| 2004/0031248 A1* | 2/2004 | Lindsay | B01D 46/0023 55/385.3 |
| 2004/0192186 A1* | 9/2004 | Bourgeois | B01D 46/12 454/187 |

(Continued)

*Primary Examiner* — Jacob T Minskey
*Assistant Examiner* — Minh-Chau Pham
(74) *Attorney, Agent, or Firm* — Defillo & Associates, Inc.; Evelyn Defillo

(57) ABSTRACT

Filter for application in motor vehicles in general, urban or rural use, terrestrial, aquatic or aerial use, such as car, motorcycle, truck, bus, train, boat, ship, vessel, airplane, jet ski, snowmobile, tractor, any vehicle or machine powered by a combustion engine, electric, hybrid, hydrogen, gasoline, methanol, ethanol, butanol, diesel, kerosene, or any other technology or fuel, which can also be applied to any equipment using a combustion engine, like generators or turbines for stationary power generation, large water pump and agricultural equipment use, and aircraft powered by turbo-jets, turbo-fans, turbo propellers, piston engines or others, and may also provide versions for residential, commercial, industrial and hospital use, among others, with the addition of a power supply (transformer) on the power input and a possible adjustment in a cabinet with appropriate design for each use.

10 Claims, 1 Drawing Sheet

(56) References Cited

U.S. PATENT DOCUMENTS

2005/0108996 A1* 5/2005 Latham .............. B01D 46/0023
                                                       55/385.2
2013/0057160 A1* 3/2013 Adams ............... H05B 33/0845
                                                       315/160

* cited by examiner

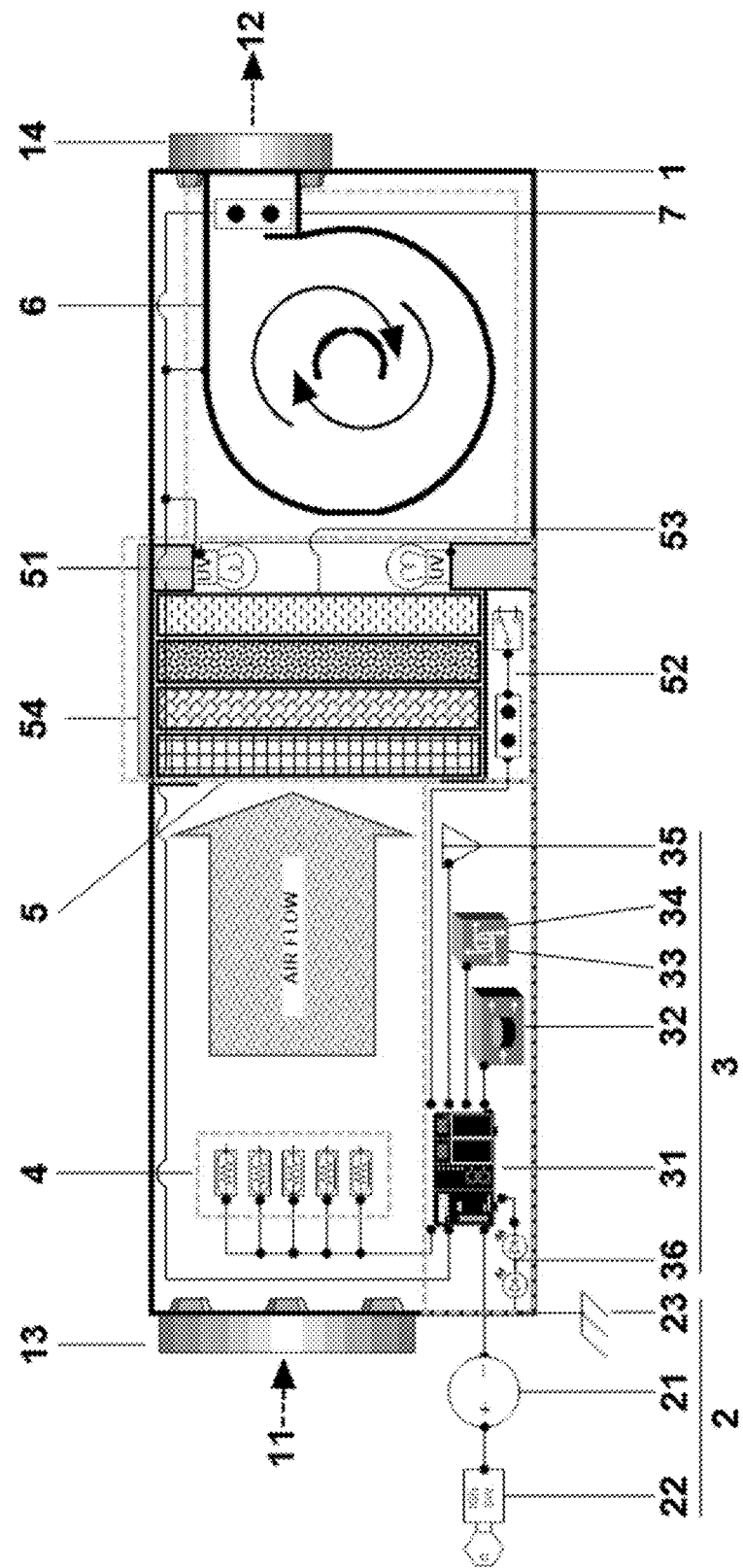

FILTER

FIELD OF THE INVENTION

This descriptive Invention Patent Report relates to a filter for use in motor vehicles in general, urban or rural use, also for all terrestrial, aquatic or aerial vehicles, such as cars, motorcycles, trucks, buses, trains, snowmobiles, boats, ships, jet skis, aircraft, tractors, any motor vehicle or machine powered by a combustion engine, hybrid, electric, hydrogen, gasoline, methanol, ethanol, butanol, diesel, kerosene, or any other technology or fuel.

The filter can also be applied to any device that uses a combustion engine, for example, stationary generators or turbines for power generation, water pumps and agricultural machinery, as well as aircraft propelled by turbo-jets, turbo-fans, turbo propellers, piston engines or any other technology.

The filter can also provide versions for residential, commercial, industrial and hospital use, among others, with the addition of a power supply (transformer) on the power input and a possible adjustment in a cabinet with an appropriate design for each use.

STATE OF THE ART

The technique used in air filtration in motor vehicles aimed primarily to supply best quality air inside the engine's combustion chamber, through the use of an engine air filter, treat the exhaust gases generated by combustion, through the use of a discharge filter, and insert fresh air into the passenger compartment of the vehicle, through the use of an air-conditioner air filter or cabin filter.

It is known in the actual state of the art various types of devices for filtering exhaust gases, such as for example, the method described in patent document PI-9401885-5, which aims at reducing the emission of particulate matter and smoke, emitted by diesel-cycle engine, two or four stroke, naturally aspirated or turbocharged, direct injection or indirect, in any application of driving force in cargo, passenger transport vehicles or industrial machines, with the use of ceramic, metallic or other filter element, incorporated in the engine exhaust system with the option of using a fuel additive in predetermined dosages, filter according to the specifications of the fuel, engine type, its application and its mode of operation, which will allow spontaneous regeneration of the filter in service, and the reduction of the initial temperature of the burning fuel when needed for regeneration of the filter, still being planned automatic means of controlling particulate mass retained on the filter by pressure differential, and per unit of time preset, filter regeneration obtained from the application of dry air flow at the filter output with collection of retained particles and later burn of these particles through the use of electrical resistance; however, assuming that the procedures described herein are capable of effectively retain all particles produced due the combustion process, there will still be the production of gases from the burning of these particles which, in turn, will contribute to the formation of new pollutants.

It is also known at the current state of the technique the development described in Patent MU-8800987-4 document, which, based on Resolution number 315 of the National Council of the Environment—CONAMA, of Brazil, which establishes, through the Program for Control of Air Pollution by Automotive Vehicles—PROCONVE, the maximum emission of pollutants from the exhaust system of light vehicles, passenger or cargo, employing Otto, Diesel or natural gas cycles, proposes as substituent of the techniques used to reduce the operating temperature of the engine, the adoption of activated carbon filter, resulting from treatment of inorganic or organic material which generates an element with high absorption capacity due to the production of controlled pore size from diameters of 1 Å (Angstrom), which is used as a molecular sieve, separation based on the size of the molecules of liquid and gaseous phases, having as a raw material for the production of coal to be used in the filter the bark of babassu a plant, which will be used for retaining particles of carbon resulting from the burning of Diesel; however, according to research from the United Nations Program for Development—PNUD revealed that the higher costs for the production of charcoal from coconut and babassu are associated with the collection, preparation and transportation of the raw material, and, as its cultivation is scattered, the producers choose to seek lower-cost biomass, and ignoring environmental and social implications, its production is not competitive; in patent document in reference it is still provided the use of hydrophobized expanded vermiculite for retention of particles and hydrocarbons, making them soluble in water; however, the disadvantage of this alternative stems from its granulometry, with consequences in the production process of the filter, which requires the use of binding substances to increase its stiffness; the patent document in reference also provides information about the use of terpene, primarily due to its property of neutralizing odors, with application in the treatment of air and water, and that can be used, including the elimination of volatile gases, to contain and eliminate the impurities present in the air, especially carbon particles and derivatives of hydrocarbons in volatile state as a result from combustion; however, the risk associated with the use of terpenes is related to their flammability.

It is known at the current state of the art, the development described in patent document PI 0702399-5, which relates to an electrostatic filter against pollution for vehicular use aimed at minimizing the emission of pollutants from the exhaust system resulting from the burning of fuel, having, as a basic principle to promote the passage of air, the exhaust gases flowing through an intense electric field, where the pollutant particles acquire electric charge and are attracted also by the action of an electric field to the collecting wall, and then removed through mechanisms properly prepared for this purpose, and filter is constructed in the form of a tube to be connected to the vehicle's exhaust system, with ionizing electrodes disposed along the tube near its central axis, with a grid shaped screen at the filter's input to homogenize the air flow, being the corona in charge of the ionization of pollutant particles produced by the application of high voltage between ionizing electrodes located in the central region of the tube, while the collecting walls are in the inner face of the tube and the high voltage is applied between the electrodes and the walls of the tube, creating the electric field which produces electrical charge on the particulate pollutants, which are attracted to the tube wall, where are located small holes which function as collectors of waste removed from the air, which is stored in a chamber, to be subsequently withdrawn; however, this development has the disadvantage of, as the electric field required to form the corona discharge has different characteristics compared to that needed to collect the pollutant particles, supplying these two stages with a common voltage avoids the electronic control of the filter characteristics.

It has also been know from the current state of technical development described in patent document PI 9905654-2, which relates to heating and/or cooling the passenger's compartment of an automotive vehicle, which is a device comprising of a pollution sensor itself for pollutants detection, particularly carbon monoxide in the air stream flowing inside the cabin, which consists of a box for air intake, which can be supplied selectively with the outside air or recirculation of cabin air inside the device box, having at the output of the box a device for the treatment (for heating and/or cooling) of the air before acceptance inside the cabin through proper nozzles, and the selection of the incoming air in the passenger's compartment is carried out by the driver of the vehicle, based on subjective observations, device box supplied with an air quality sensor to detect the presence of pollutants and how the air intake will flow into the passenger's compartment is determined by the driver or even automatically; this sensor, originally installed in the front of the vehicle, can now be installed along the air filter, for capturing different types of gases or impurities contained in external air flow, and since due to its installation position it was subjected to rapid deterioration, the proposal of this patent document suggests the device for heating and/or cooling to be installed where the pollution sensor of the air filter is installed, being exposed to a flow of previously filtered air and therefore free of particles and impurities, consequently under lower deterioration pressure; however, despite the proposed solution extends the sensor's life, it is not able to identify, record and link the conditions of the air to the areas where the vehicle was.

Electric vehicles, although they do not emit pollutants as a result of their operation, they do also generate air and environmental pollution, both in the manufacturing process and at the disposal of its components, and, most especially, from the consumption of tires, which like other vehicles moving with some kind of friction with the ground, generates at first a significant amount of particulate matter in the atmospheric air; particulate material that will be deposited on the surface of the streets and highways, and that, ultimately, will end by causing pollution of the seas, rivers and lakes, carried by the storm water drainage system.

SUMMARY OF THE INVENTION

Notwithstanding the type of motor vehicle, all do contribute to the release of pollutants into the atmosphere and therefore it is desirable to reduce and preferably eliminate those agents from the atmospheric air.

Even if the cabin air filter corroborates in some way to the air filtration, it alone is not big enough to absorb even the pollution generated by the vehicle itself, and even less to redeem part of environmental damage generated by decades of emissions, simply because cabin air filters were designed to filter a small volume of air for local use only.

The elements of the filter here proposed are common, and what is proposed by the present invention is the rearrangement of these elements to meet specific purposes, for an application so far unexplored by similar equipment.

A second aspect of the present invention is the capacity to generate information on the concentration of pollutants in the atmosphere by sensors installed along with the filter to meet this purpose.

Currently, information on the concentration of pollutants in the environment is produced by weather monitoring stations installed in cities or in rural areas, which are essentially fixed stations.

Thus, the present invention is aimed to provide a filter for use in motor vehicles in general, urban or rural use, also for all terrestrial, aquatic or aerial vehicles, such as cars, motorcycles, trucks, buses, trains, snowmobiles, boats, ships, jet skis, aircraft, tractors, any motor vehicle or machine powered by a combustion engine, hybrid, electric, hydrogen, gasoline, methanol, ethanol, butanol, diesel, kerosene, or any other technology or fuel with hardware for data collection and its transmission that will be of great value, to the extent that one can identify locations and times of greatest concentration of pollutants as well as the type of pollutant, what will support the environmental agencies decision making process.

This proposal may also provide versions for residential, commercial, industrial and hospital use, among others, expanding and diversifying the application of air filters currently in use that do only focus on the basic function of filtering the air.

This proposal also innovates in the sense that there is currently no equipment that adds sensors for the identification of pollutants in the environment to air filters, and do also set up hardware to collect, record and transmit collected data.

The present invention, in its version for automotive use, promote the absorption of pollutant particles in suspension in the atmospheric air, in order to assist in reducing air pollution, largely generated by motor vehicles, helping in the rescue of environmental damage generated over decades.

The present invention, in its monitoring version, will collect data on atmospheric air quality and will remotely transmit data to environmental agencies in order to support solutions that aim at reducing the impact of air pollution and therefore in population daily life and health.

The present invention, in addition to actively contribute to the removal of pollutants from the atmosphere, may in more sophisticated versions, be equipped with sensors for monitoring the concentration of pollutants and for the identification of these pollutants.

The present invention may also, in less sophisticated versions, register air quality levels without identifying each pollutant individually, and may perform its primary function, which is to filter the air.

The technical efforts of the automotive industry in the past century were focused on reducing emissions of pollutants with the development and use of catalytic converters and in engines with electronic injection and greater efficiency in the use of fossil fuels.

Other efforts resided in the reduction of fuel consumption, the use of cleaner alternative fuels, e.g. hydrogen; the development of biofuels, such as ethanol and methanol, biodiesel, or blend of fuels with the addition of alcohol to gasoline, and most recently, the addition of biodiesel to diesel and biokerosene to aviation kerosene.

Many investments have also been designed to ensure the viability of the electric vehicle and its economically viable version in the current state of the technology, called the hybrid vehicle, which combines a combustion engine to another essentially electric one.

The line of action chosen by the automotive industry was to pollute less, but there is no significant effort to correct what has already been done, being the environmental damages simply ignored and the problem left to be solved by nature alone.

On the other hand, the legislation has evolved and some positive initiatives, such as mandatory recycling of cell phones and batteries by their manufacturers and importers and, without a doubt, the initiative that has been generating the most positive impact is the obligation imposed on manufacturers and importers of tires, intended for recycling a number greater than the number of units produced or imported, gradually recovering environmental damages of the past.

However, it is not enough just to prevent the practice of environmental damage, but there is a real need to rescue the environmental damage generated in the past, since nature signals that its ability to absorb damage generated by mankind has come to its limit.

Thus, with the use of the present invention, motor vehicles in general, urban or rural use, also for all terrestrial, aquatic or aerial vehicles, such as cars, motorcycles, trucks, buses, trains, snowmobiles, boats, ships, jet skis, aircraft, tractors, any motor vehicle or machine powered by a combustion engine, hybrid, electric, hydrogen, gasoline, methanol, ethanol, butanol, diesel, kerosene, or any other technology or fuel will be able to absorb all the pollution emitted by themselves and will even recover part of what has been released into the atmosphere, in a continuous process of recovery of the environment.

Another important aspect of the present invention is that the filter may be equipped with, in addition to the filtering elements, sensors for atmospheric pressure, relative humidity, pollutants, contaminants and allergens to identify the quality of the atmospheric air and may, in some more complete models, associate its collected data with georeferencing information.

Access to collected data can be performed in several ways, e.g. data collection in repair shops when performing maintenance on vehicles, in specialized sites for pollutant emission inspection for annual licensing, by data transmission through wireless technologies such as readers installed on toll gates, checkpoints on highways, at gas stations, traffic signal poles or streetlights or even by using low cost data networks, operated by telephone companies, e.g. the networks used by vehicle tracking or credit card companies.

The filter of the present invention report supports the use of different types of filtering elements, ultraviolet lamps, catalytic convertors and ionizing electrodes and will also help in reducing the levels of allergens and contaminants in suspension in the air, as for example, dust, pollen, fungi, bacteria, viruses, volatile organic compounds (VOC), ozone ($O_3$), methane ($CH_4$), ammonia ($NH_3$), carbon monoxide (CO), carbon dioxide ($CO_2$), nitrogen oxides ($NO_x$), in particular nitrogen dioxide ($NO_2$), sulfur oxides ($SO_x$), in particular sulfur dioxide ($SO_2$), hydrogen sulfide ($H_2S$), hydrogen cyanide (HCN), hydrochloric acid (HCl), chlorine gas ($Cl_2$), arsenic hydride ($AsH_3$), phosgene ($CCl_2$), phosphorus hydride ($PH_3$), silane ($SiH_4$), chlorine dioxide ($ClO_2$), hydrofluoric acid (HF), lead (Pb), aldehydes (HCO), formaldehyde ($CH_2O$), total hydrocarbons (HCT), particularly chlorofluorcarbons (CFCs), non-methane hydrocarbons (NMHC) and unburned hydrocarbons (UHC), particulate matter (PM) and soot in suspension, among others, and may also measure other gases such as oxygen ($O_2$) and hydrogen ($H_2$), among others.

In the version for residential, commercial, industrial or hospital use, present invention will allow access to valuable information such as concentration levels of pollutants and which is the higher level pollutant in the environment, providing important information for decision making such as identifying the source of such pollutant for its elimination, the need or not to use the filter and to better manage energy costs, or even to contribute to government statistics about the elements found in various areas of each location, so that government can communicate the population in a proper manner and take appropriate action to ensure the population safety.

BRIEF DESCRIPTION OF THE DRAWING

For a better understanding of the proposed filter, reference is made to the attached drawing, in which:

FIG. 1 illustrates a schematic broken longitudinal section view showing the constructive arrangement of the present proposed invention.

DETAILED DESCRIPTION OF THE PREFERRED EMBODIMENTS

Turning now to FIG. 1, the filter of the present Invention Patent Report comprises a cabinet (1), in which are installed the power source input (2); the electronic components (3); the block of sensors (4); the group of filtering elements (5); the exhauster (6) and the ionizing electrodes (7).

The cabinet (1) is made of materials suitable for this purpose, and can be made of polymers, plastics, metal, aluminum or wood, in which the other components are installed; the cabinet contains two main openings, one for air intake (11) from the environment and the other for filtered air output (12); these main openings may be installed in any position in the cabinet, in the same cabinet side or even side by side, since the air flow is determined by the internal arrangement of the components, may also be provided with directional ducts for air intake and air output to prevent a feedback loop, also with a pre-filter (13) coupled to the air inlet to retain larger particles, such as leaves, pet hair, pieces of plastic or paper and others; a protection (14) is coupled to the filtered air output (12) to avoid the introduction of objects or body parts in the exhauster (6).

The cabinet (1) has a power source input (2), with power supply (21) controlled by a switch (22), whereas the filter is only powered on when the main engine switch is turned on, to save battery, and in more complete models, the engine itself will only be started after the filter device detects that filtering elements are installed and working properly; and could alternatively employ a connector or receiver for wireless energy transfer, through radio frequency, magnetic base or other technology. Cabinet (1) also provides a connector to attach the ground wire (23).

The cabinet (1) provides room for the installation of electronic components (3), which includes the central processing unit (31), a data storage device (32), the communication data port (33), the associated devices for data communication and/or transmission (34), and the geo-referenced positioning system (35).

Regarding the equipment operation status lights, if one chooses to place local signage, provision should be made for the installation of LED lamps (36) or from other technology on the cabinet, and, if the option is to have this status information available directly on the vehicle's dashboard, this provision may be waived, since the information will be transmitted through the communication data port (33/34).

In the current stage of technology it is already feasible to have the electronic components (31, 32, 33, 34, 35 and 36) built together on a small printed circuit board.

The cabinet (1) must provide area for installation of the data storage device connectors (32) and the communication data port connectors (33/34), which may be waived if data will be transmitted through wireless technology, the same applies to the signal receiver of the geo-referenced positioning system (35).

The cabinet (1) has an area for the block of sensors (4), composed of specific sensors for measure of different parameters such as atmospheric pressure, relative humidity, temperature, airflow, presence of snow or ice, and specific sensors for the detection of presence and concentration levels of pollutants, allergens and contaminants in suspension in the air, as for example, dust, pollen, fungi, bacteria, viruses, volatile organic compounds (VOC), ozone ($O_3$), methane ($CH_4$), ammonia ($NH_3$), carbon monoxide (CO), carbon dioxide ($CO_2$), nitrogen oxides ($NO_x$), in particular nitrogen dioxide ($NO_2$), sulfur oxides ($SO_x$), in particular sulfur dioxide ($SO_2$), hydrogen sulfide ($H_2S$), hydrogen cyanide (HCN), hydrochloric acid (HCl), chlorine gas ($Cl_2$), arsenic hydride ($AsH_3$), phosgene ($CCl_2$), phosphorus hydride ($PH_3$), silane ($SiH_4$), chlorine dioxide ($ClO_2$), hydrofluoric acid (HF), lead (Pb), aldehydes (HCO), formaldehyde ($CH_2O$), total hydrocarbons (HCT), particularly chlorofluorcarbons (CFCs), non-methane hydrocarbons (NMHC) and unburned hydrocarbons (UHC), particulate matter (PM) and soot in suspension, among others, and may also measure other gases such as oxygen ($O_2$) and hydrogen ($H_2$), among others.

The cabinet (1) also provides an area for a group of filtering elements (5), and this specific area includes UV lamps (51), sensors of the filters (52) and catalytic converter (53), and an access lid (54) for replacement of filters and easy access to the inner side of the cabinet (1).

Filtering elements (5) can be combined according to the need of the region where the vehicle is used, and may be composed of paper filters of different porosities, HEPA or ULPA filters, catalytic converters (53), ceramic filters, filters impregnated with several substances such as sodium bicarbonate, activated carbon or nano particles of titanium dioxide ($TiO_2$) among other compounds.

The UV (51) bulbs must be preferably installed after the group of filtering elements (5) and the catalytic converter (53).

The filter's sensors (52) must be fixed at the base intended to support the filtering elements (5) and are designed to detect the presence of the catalytic convertor (53) and the filtering elements (5), and monitor their function and saturation.

The access lid (54) is intended to facilitate the installation and replacement of filtering elements (5), the UV bulbs (51) and the catalytic convertor (53).

The cabinet (1) also provides a specific area for the installation of the exhauster (6), which will ensure that the air flow, coming from the inlet opening (11), passes through the entire cabinet (1), the pre-filter (13), the block of sensors (4), the filtering elements (5), the catalytic converter (53), the UV bulbs (51) and the ionizing electrodes (7), returning filtered to the environment through the outlet opening (12).

The invention claimed is:

1. A filter comprising:
   a cabinet having an air net and an air outlet;
   a pre-filter connected to the air inlet;
   a protection device attached to the air outlet;
   a power source input (2) connected to the cabinet;
   a power supply device connected to the power supply input, the power supply device is controlled b a switch;
   electronic components (3) including a central processing unit, a data storage device, a communlcation data port, a transmitter, and a GPS device;
   a block of sensors (4) including sensors selected from the group consisting of atmospheric pressure sensors, relative humidity sensors, temperature sensors, airflow sensors, cold climate senors, pollutants sensors, allergens sensors, contaminants sensors, or combination thereof;
   a group of filtering elements (5) including a catalytic converter in addition to at least one filter selected from the group consisting of paper filters, HEPA filters, ULPA filters, ceramic filters, and chemical impregnated filters;
   a UV lamp located after the catalytic converter and towards the air outlet;
   an exhauster (6) located inside the cabinet and connected to the air outlet; and
   ionizing electrodes (7) located inside the exhauster.

2. The filter in accordance with claim 1, wherein the cabinet (1) is made of materials selected from the group consisting of polymers, plastics, metal, aluminum, and wood.

3. The filter in accordance with claim 1, wherein an air flow is determined by an internal arrangement of the components.

4. The filter in accordance with claim 1, further comprising a duct connected to the air inlet.

5. The filter in accordance with claim 1, optionally including a connector or receiver for wireless energy transfer.

6. The filter in accordance with claim 1, wherein the cabinet (1) including a connector for attachment of a ground wire (23).

7. The filter in accordance with claim 1, wherein the cabinet (1) further includes LED lamps (36) to display the equipmemnt status.

8. The filter in accordance with claim 1, wherein the electronic components (31, 32, 33, 34, 35 and 36) are built on a printed circuit board.

9. The filter in accordance with claim 1, wherein the cabinet (1) further including
   an access lid (54) connected to the group of filtering elements.

10. The filter in accordance with claim 1, wherein the block of sensors (4) measure at least one of pollutants, allergens and contaminants in suspension in the air, as for example, dust, pollen, fungi, bacteria, viruses, volatile organic compounds (VOC), ozone ($O_3$), methane ($CH_4$), ammonia ($NH_3$), carbon monoxide (CO), carbon dioxide ($CO_2$), nitrogen oxides ($NO_x$), in particular nitrogen dioxide ($NO_2$), sulfur oxides ($SO_x$), in particular sulfur dioxide ($SO_2$), hydrogen sulfide ($H_2S$), hydrogen cyanide (HCN), hydrochloric acid (HCl), chlorine gas ($Cl_2$), arsenic hydride ($AsH_3$), phosgene ($CCl_2$), phosphorus hydride ($PH_3$), silane ($SiH_4$), chlorine dioxide ($ClO_2$), hydrofluoric acid (HF), lead (Pb), aldehydes (HCO), formaldehyde ($CH_2O$), total hydrocarbons (HCT), particularly chlorofluorcarbons (CFCs), non-methane hydrocarbons (NMHC), unburned hydrocarbons (UHC), particulate matter (PM) and soot in suspension, gases such as oxygen ($O_2$) and hydrogen ($H_2$).

* * * * *